United States Patent [19]

Ostertag

[11] Patent Number: 4,488,929
[45] Date of Patent: Dec. 18, 1984

[54] APPARATUS FOR THE PRODUCTION OF A CONTINUOUS COMPOSITE MATERIAL

[75] Inventor: Karl Ostertag, Erlenbach, Fed. Rep. of Germany

[73] Assignee: Akzona Incorporated, Enka, N.C.

[21] Appl. No.: 515,468

[22] Filed: Jul. 20, 1983

[30] Foreign Application Priority Data

Jul. 21, 1982 [DE] Fed. Rep. of Germany ....... 3227144

[51] Int. Cl.³ ............................................. B32B 31/04
[52] U.S. Cl. ................................... 156/553; 156/292; 156/555; 156/583.1
[58] Field of Search ............... 428/178, 200, 284, 920, 428/154, 184, 212, 474.7, 475.2, 477.4; 156/292, 308.2, 308.4, 467, 553, 516, 555, 583.1

[56] References Cited

U.S. PATENT DOCUMENTS

| | | | |
|---|---|---|---|
| 3,370,520 | 2/1968 | Manch | 428/178 |
| 4,103,059 | 7/1978 | Kantz | 428/178 |
| 4,386,128 | 5/1983 | Yoshikawa | 428/152 |

Primary Examiner—George F. Lesmes
Assistant Examiner—William M. Atkinson
Attorney, Agent, or Firm—David M. Carter; Jack H. Hall; Francis W. Young

[57] ABSTRACT

A composite material consisting of at least three layers joined by welds, wherein, in order to prevent the intrusion of cold, as well as to improve the hand, the points of fusion do not join all layers, but in each case only a part thereof. It is especially suitable for the manufacture of clothing and bedding. A new process and apparatus for its manufacture is also disclosed.

1 Claim, 4 Drawing Figures

APPARATUS FOR THE PRODUCTION OF A CONTINUOUS COMPOSITE MATERIAL

The invention refers to a strip or web of composite material consisting of at least three layers joined to one another by points of fusion. By layers are to be understood lengths of film, foamed materials or textile fabrics, such as woven or knitted fabrics, netting or nonwovens. They are joined to one another by fusing, i.e. the local cementing together of adajcent layers due to the temporary influence of heat and perhaps also of pressure.

In their textile nature in the sense of DIN 60 000 (January 1969) preponderates, such strips of composite materials are mainly used for clothing purposes. In such cases they are used to improve bodily comfort, above all from the viewpoint of hygiene, mainly by providing protection against cold by virtue of their porous structure, which contains pockets of air.

Such a strip of textile composite material consisting of several layers joined together by points of fusion is described in German Registered Design No. G 81 28 386.5. As shown therein, at the point of fusion, all layers were heated continuously from one side of the strip to the other side, until the thermoplastic polymers had become sufficiently adhesive, and then pressed together. As a result, the composite material completely lost its advantageous porous structure with air pockets at the points of fusion. It becomes practically compact; its thickness is reduced by at least half. Thus, its insulating capacity is drastically worsened. So-called cold intrusion bridges are formed. Another disadvantage of the continuous welding seam is the fact that it makes the hand distinctly harder.

In spite of these disadvantages, because of the advantages of the principle of fusing, such as cleanliness, rapidity and the absence of a need for additional auxiliary materials, an expansion of its application is still of interest. Among other things, it is troublesome thereby, that there are difficulties with some fusing processes, e.g., in the heat impulse process. The reason is that in this case the thermoplastic materials to be fused are heated from the outside. The thermoplastic materials, furthermore, are poor heat conductors. Thus the thicker the thermoplastic materials are, the more difficult it becomes to obtain satisfactory heat distribution over the entire fusing location.

The goal of the invention, therefore, was to improve the known composite materials with their continuous fusion seams going from one side to the other and comprising all layers, so far as their insulating capacity and hand are concerned. In addition, it will be shown how even thick layers can be fused to one another with fewer difficulties as regards the heat conductivity.

The problems noted above are being solved by the invention disclosed herein. It consists mainly in the fact that in each case the fusion points do not join all layers together. Therefore, if a composite material consists, e.g., of three layers, not all fusion points always join together all three layers, but a part of the fusion points joins the center layer only to the one outside layer, while the other part joins it only to the other outside layer.

Advantageous versions of the invention are obtained if the composite material contains only textile fabrics, whereas if the composite material contains, e.g. only film, a continuous fusion results which is not suitable for producing a composite having a textile hand. However, composite materials of textile fabrics and non-textile materials such as, e.g., film, may be suitable, if the textile nature preponderates, i.e., if the textile nature of the surface materials and/or the overall physical-technological characteristics are typical of textiles. The non-textile layer, e.g., a film may serve an additional function, such as making the composite material impervious to wind and water or making it flame- and heat-resistant. The textile nature of the composite material is retained especially in those cases where the non-textile layers that are used are of low thickness and high pliability.

The incorporation of at least 10% of a bonding fiber of a synthetic polymer, having a melting point at least about 10-50° C. below that of the other synthetic polymer(s) making up the filaments or fibers of the individual layers of the composite, into one or more layers of the composite, preferably into each layer, increases the bonding strength between the individual layers. The bonding polymer can be distributed in the layers in various ways; it can, e.g., be contained therein as the skin component of a bicomponent fiber of the core/skin type or one component of a side-by-side bicomponent fiber or as a fiber in a fiber blend.

It is especially advantageous when the layers contain two different polymers with different melting ranges, such as polyamide 6 and polyamide 6.6. In this instance, one obtains good adhesion due to the component with the lower melting range and retention of the fiber structure of the higher melting component.

There are several possibilities for the manufacture of the claimed strip of composite material. The process pursuant to the invention provides that the fusing tool does not act on all layers at any one of the fusion sites. For instance, if a total of 4 layers comprises the composite material, the two middle layers, at a location to be fused, are heated by the heating element with only one outside layer and then joined together under the required pressure. At another location the middle layers are fused only with the other outside layer.

Pursuant to the invention, this process is made possible by the fact that the layers, from the point of entry of the strips into the device for the manufacture of known fused composite materials, which device is known as such, up to the fusing tool, are kept apart by two elements of the device, one arranged above the other, which elements have the shape of a comb. The longitudinal axis of the teeth of the comb-like elements are arranged parallel, but shifted laterally with respect to those of the opposing element. When a strip is introduced into the device above these elements, then the comb-like elements will prevent all three layers from making contact with each other. The teeth of the elements permit the direct contact of two strips only at a certain place. The third layer is kept away from the other layers until the fusing tool has effected a bond. Preferably, the elements are shifted laterally to such an extent with respect to each other that the teeth of the one element completely cover the gap between the teeth of the opposing element.

BRIEF DESCRIPTION OF THE DRAWINGS

In FIG. 1 so as to show clearly the element 5, web 1 has been omitted.

DESCRIPTION OF THE INVENTION

Figure 1:
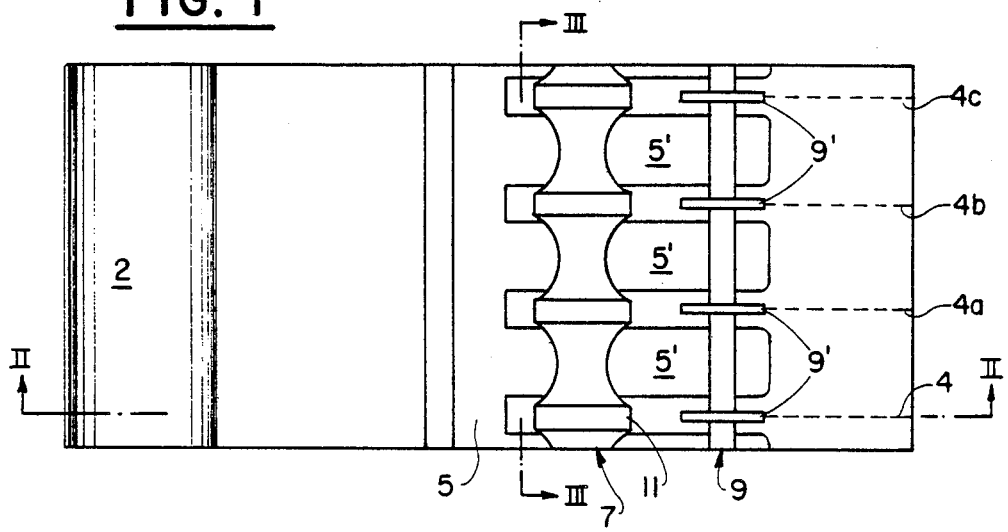
FIG. 1 is a schematic top view of the apparatus used in the manufacturing process according to the invention.
Figure 2:
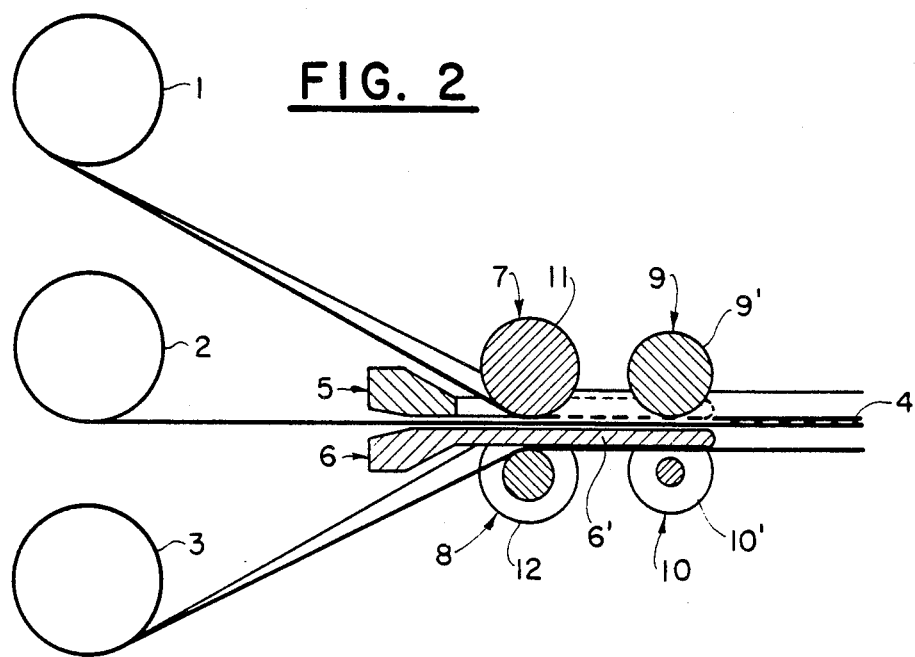
FIG. 2 is a cross-sectional view of the apparatus of FIG. 1 through line II—II, showing the comb-like elements which guide the layers of webbing through the fusing device to prevent certain of the layers from being fused at a particular fusing site or location.
Figure 3:
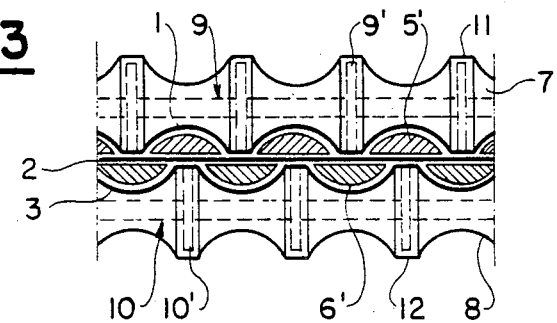
FIG. 3 is a cross-sectional view through line III—III of FIG. 1 showing the feed roller and comb-like guide elements referred to above.

Referring to FIGS. 1, 2, and 3, which are intended to represent the manufacturing process and the apparatus for making a composite material pursuant to the invention, three strips of a web of sheet- or textile-like material 1, 2, 3 are fed from supply rolls to the fusing device. Each of the webs may be the same or different and, preferably, contain at least about 10% of a bonding fiber, as described above, although one of the webs, e.g. 2, may be a film serving an additional function. Web 1 is fed between upper feed roller 7 having lands 11 and the upper comb-like guide element 5, which projects from the gap between feed rollers 7 and 8 toward the supply rolls. Teeth-like extensions 5', 6' of the guide elements 5 and 6 extend rearwardly beyond the feed rollers 7 and 8 to somewhat past the fusing tools 9 and 10. Spaces between the teeth-like extension 5' permit the lands 11 of the feed roller 7 to press the webs 1 and 2 against the flat side of the teeth-like extensions 6' of the lower guide element 6. Web 1 forming the upper layer 1 of the composite material is guided between the feed roller 7 having cut-out arcuate sections and corresponding arcuate upper surfaces of the extension 5' of the comb-like element 5, which is more clearly shown in FIG. 3. Web 2 is fed to the fusing device between the upper comb-like element 5 and the lower comb-like element 6. Web 3 is fed into the fusing device between lower guide element 6 and lower feed roller 8 having lands 12, and also having arcuate cut-outs in the cross-section corresponding to the arcuate lower surfaces of the finger-like extension 6' of lower comb-like guide element 6. Spaces between the extension 6' permit the lands 12 of the feed roller 8 to press the webs 2 and 3 against the flat side of the extensions 5' of the upper guide element 5.

Thus webs 1 and 3 are deflected as they pass between feed roller 7 and element 5 and feed roller 8 and element 6, respectively, so that the large circumferential portions, or lands, 11 of the feed roller 7 brings upper web 1 into pressure contact with web 2 between the lands 11 of the circumference of roller 7 and the flat upper surfaces of the extensions 6' of lower guide element 6 along the lines or linear zones where they are eventually fused as at 4, 4a, 4b, and 4c by the fusing tool 9. Likewise, web 3 is brought into contact with web 2 only between the large circumferential portions of the circumference, or lands, 12 of feed roller 8 and the flat lower surfaces of the extension 5' of the upper guide element 5, which line of contact is shifted laterally with respect to the line of contact formed between the upper feed roller 7 and the flat portions of the extension 6' of lower guide element 6. Fusing tools 9 and 10 each comprise a series of heated disks 9', 10' at a temperature sufficient to soften or melt the bonding fiber. The disks 9' of fusing tool 9 contacting the upper layer in line with the contacting areas where the paths of webs 1 and 2 coincide caused by the feed roller 7 and the opposing finger 6. The disks 10' of the fusing tool 10 contact the web 3 in line with the area where the paths of webs 2 and 3 coincide and which are brought into contact by feed roller 8 and upper guide 5. In this manner layer 3 has no direct contact with middle layer 2 at the points where layers 1 and 2 are in contact and, likewise, layer 1 has no contact with layer 2 at the points where layers 2 and 3 are brought into contact until after the web has passed the fusing tools 9 and 10. In this way, layer 1 is not fused to layer 2 at the point where layers 2 and 3 are fused, nor is layer 3 fused to layer 2 at the points where layers 1 and 2 are fused together.

The configuration of the layers as described above has already been formed as the layers pass between the feed rollers 7 and 8, but have not yet been fixed, or fused, into the composite materials final state. Fusing of layers 1 and 2 takes place on heating by the fusing tool 9 and subsequent cooling to form seams as at 4, 4a, 4b, 4c. Seams joining layers 2 and 3 are formed by contacting fusing tool 10, shown at 14, 14a and 14b of FIG. 4.

Figure 4:
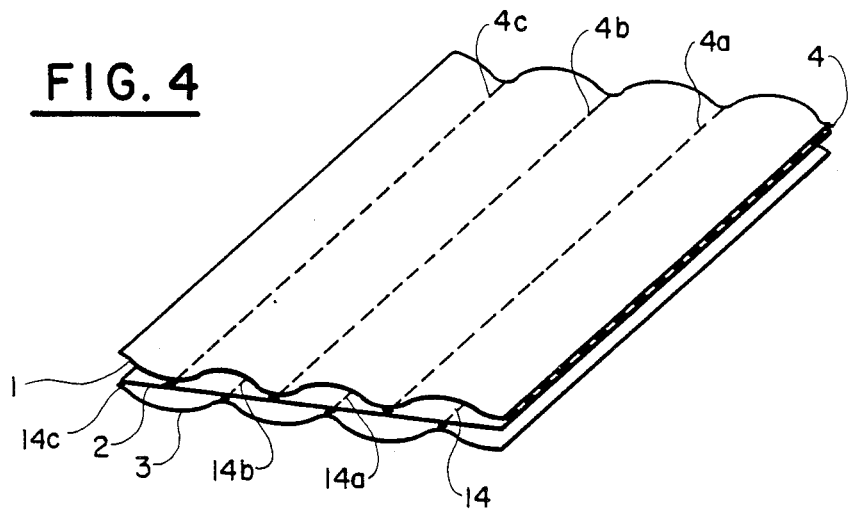
FIG. 4 schematically shows the structure of the composite material made in the apparatus of FIGS. 1-3 by the process of the invention.

The structure of the composite material formed by the process above-described is illustrated in FIG. 4. The composite material consists of three layers in which fusion seams 4, 4a, 4b and 4c join layers 1 and 2 together without fusing layer 3 at this place. Fusion seams 14, 14a, 14b and 14c are shown where layers 2 and 3 are joined to one another without fusing layer 1 there. The fusion seams may be linear straight lines with more or less frequent interruptions, thus, e.g., continuous, broken or dotted lines. To obtain broken or intermittent fusion seams, the circumference of the disk 9', 10' of fusion tools 9 and 10 are discontinuous, e.g., notched or toothed.

In general, the spacing between the lines of fusion may range from 1 to 10 cm. and the degree of firmness with which the layers are to be joined may be varied, depending upon the desired hand of the composite material. In essence, the distance between fusion seams results from the spacing of the disks 9', 10' of fusing tools 9 and 10 and the lateral displacement of the series of disks 9' on fusing tool 9 from the disks 10' on fusing tool 10. It goes without saying that instead of layers 1, 2 and 3, use can also be made of several layers in each case, e.g., 2 layers on top, 3 layers in the middle and one layer on the bottom.

In the manufacture of the composite material pursuant to the invention, full use can be made of current knowledge in selecting the initial materials (e.g., kind, number, sequence and thickness of the layers; nature of the polymers and additives used). The fusing methods are also well-known. The advantages obtained with the invention consist in particular of the fact that no continuous fusion locations are present in the composite material and thus no cold intrusion bridges. Also, the hand does not become as hard, since the fusion seams are not as thick as when the seams are fused through all layers of the composite material. The manufacturing process also makes it possible to use thicker layers since, in each case, only a part of all layers is fused and, as a consequence, the heat has to be conducted through only a part of the layers. Due to their advantages, the composite materials pursuant to the invention are particularly well suited for the manufacture of clothing. Preferred areas of end-use are the following: sport clothing, winter clothing, robes, raincoats, diapers and sheets and mattress covers, especially in hospitals to reduce the possibility of bedsores.

I claim:

1. An apparatus for making a composite material comprising a web supply means for at least three continuous layers of sheet-like material, upper and lower rollers for feeding said layers, upper and lower comb-like guide elements, fusing means adjacent said feed rollers comprising upper and lower fusing tools, said guide elements disposed between said upper and lower rollers projecting toward said web supply means and having teeth-like extensions thereof extending rearwardly past said fusing means and spaces therebetween, said extensions of said upper guide elements having arcuate upper surfaces and flat lower surfaces, said extensions of said lower guide elements having arcuate lower surfaces and flat upper surfaces, said upper roller having arcuate segments and lands therebetween, adjacent and correspondingly arcuately shaped to said arcuate surface of said upper guide element, said lower rollers having arcuate segments and lands therebetween, adjacent and correspondingly arcuately shaped to said arcuate surface of said lower guide element, a space between said upper feed roller and said upper guide defining a first path for feeding said upper layer of said sheet-like material therebetween, a space between said upper guide and said lower guide defining a second path for feeding an intermediate layer of said sheet material therebetween, a space between said lower feed roller and said lower guide element defining a third path for feeding said lower layer of said sheet-like material therebetween, a space between said teeth-like extensions of said lower guide elements and said upper fusing tool defining an extension of said first path, a space between said teeth-like extensions of said upper guide element and said lower fusing tool defining an extension of said third path, said second path intercepting said first path in first linear zones between lands of the upper feed roller and the flat upper surfaces of the teeth-like extensions of the lower guide element and remaining co-extensive therewith until past said fusing means, said spaces between said extension of said upper guide element each coinciding with one of said first linear zones, said second path intercepting said third path in second linear zones, displaced laterally from said first linear zones, between lands of the lower feed roller and the flat lower surface of the teeth-like extensions of said upper guide element and remaining co-extensive therewith until past said fusing means, said spaces between said extensions of said lower guide element each coinciding with one of said second linear zones.

* * * * *